United States Patent [19]

Stoops

[11] 3,872,452

[45] Mar. 18, 1975

[54] FLOATING ADDRESSING SYSTEM AND METHOD

[75] Inventor: Edward H. Stoops, Endicott, N.Y.

[73] Assignee: International Business Machines Corporation, Armonk, N.Y.

[22] Filed: Apr. 17, 1974

[21] Appl. No.: 461,576

[52] U.S. Cl. .......................... 340/173 R, 340/172.5

[51] Int. Cl. ............................................ G11c 13/00

[58] Field of Search ...... 340/173 R, 173 AM, 172.5

[56] References Cited

UNITED STATES PATENTS 3,736,574 5/1973 Gersbach ........................ 340/173 R

*Primary Examiner*—Terrell W. Fears
*Attorney, Agent, or Firm*—John S. Gasper

[57] ABSTRACT

Floating addressing system and method wherein addressable units, such as storage cards, with different numbers of addresses constituting integral multiples of a basic number (e.g., 4*k*, 8*k*, 12*k*) are plugged into a back panel in random sequence. All cards with the same numbers of addresses are identical. Means associated with these cards enable them to recognize different addresses depending upon where they are plugged in, irrespective of their particular numbers of addresses or plug-in sequence. Thus, any card, irrespective of its address size, may be plugged in to replace one with a different address size, and all cards will automatically be adjusted to recognize their respective new addresses without requiring substitution of different decode logic cards, rewiring or recabling.

13 Claims, 2 Drawing Figures

FLOATING ADDRESSING SYSTEM AND METHOD

BACKGROUND OF THE INVENTION

This invention relates to systems and methods for addressing storage units, peripherals or the like, and relates more particularly to an improved floating addressing system and method enabling each of a plurality of different sized randomly plugged in and interchangeable units to recognize a unique address that varies according to the number of addresses in the units preceding it, without requiring rewiring or replacement of components other than the interchangeable units themselves.

It is customary to provide unique address decoding logic or cards for each of a plurality of addressable storage or peripheral units. This generally requires special configurations for each decoding card, depending upon the unique place of the unit in the system. If the position of the unit in the system is changed, its address will automatically change, requiring substitution of a different decode logic or card. Alternatively, a back panel may have to be rewired, or cables replaced.

SUMMARY OF THE INVENTION

One object of this invention is to provide a floating addressing system wherein sets of units of standard configurations, even those with differing numbers of addresses, may be interchanged or substituted at random without requiring replacement of decode logic or cards, rewiring, recabling, etc., while assuring that each such unit will automatically recognize the new and different address corresponding to its position in the reconfigured system.

Another object is to provide an addressing arrangement that permits random numbers of different sized memory units or the like to be plugged into an otherwise standard system or permits use of standard peripherals of different address size in a variety of different systems or in a variety of locations in the same system.

Applicant has achieved these and other advantages by providing a system comprising a plurality of addressable units (e.g., storage units, peripherals, etc.) having different numbers of addresses constituting integral multiples of a predetermined basic number (such as $4k$). Each of these units has a similar preselected number of pins representing floating address inputs and an identical number of pins representing floating address outputs. Each set of input and output pins is arranged in low to high order sequence. A preselected coded signal is applied continuously from a suitable d.c. voltage source to the input pins of the first unit in the series. The input pin in each unit is connected to that particular one of the output pins on the same unit that is indicative of the number of addresses that particular unit has; i.e., each of these output pins is displaced an identical predetermined number of places toward the high order position indicative of the size of the unit (e.g., one place for each $4k$ addresses in that unit) to cause the coded input signal to be shifted toward the high order position that same number of places and use end around carries to generate all low order positions. In every case, the output pins of each unit are connected straight across to the same order input pin in the succeeding unit.

The floating address input to each particular unit is encoded to provide an encoded output assigned address indicative of the number of multiples of said basic number (assumed as $4k$) of addresses that precedes that particular unit. Each unit has a comparator for comparing the encoded output address with a selectable address corresponding to that of a particular unit to be selected so as to provide an output signal when the selectable address equals the encoded output address. The selectable address is generated by a register or the like which may be provided on a logic page that, like the addressable units, is plugged into a common back panel. This selectable address or system address is conveyed in parallel to the comparator provided on each of the units.

One embodiment of the invention is especially suitable for use in systems of the above type having many serially arranged addressable units or a series of units having large multiples of the basic number of addresses. In such systems, a unique base address is hard wired to each unit location to denote its sequence position or location in the system assuming that all preceding units have only the basic number of addresses (e.g., $4k$); and floating address lines extend serially from unit to unit to constitute merely delta address lines that denote the number of additional multiples of said basic number present in that particular unit [e.g., $1, 2 \ldots n$ for a unit having $8k, 12k \ldots 4k(n\text{-}1)$ addresses where said basic number is assumed to be $4k$].

According to another embodiment, the number of floating address lines is increased sufficiently to develop the assigned address without requiring use of a unique base address and adder. In such case, displacement is one position toward the high order for each basic number of addresses in the particular unit.

Other object and advantages of the invention will become apparent from the following more detailed description and from the accompanying drawings.

DESCRIPTION

Figure 1:
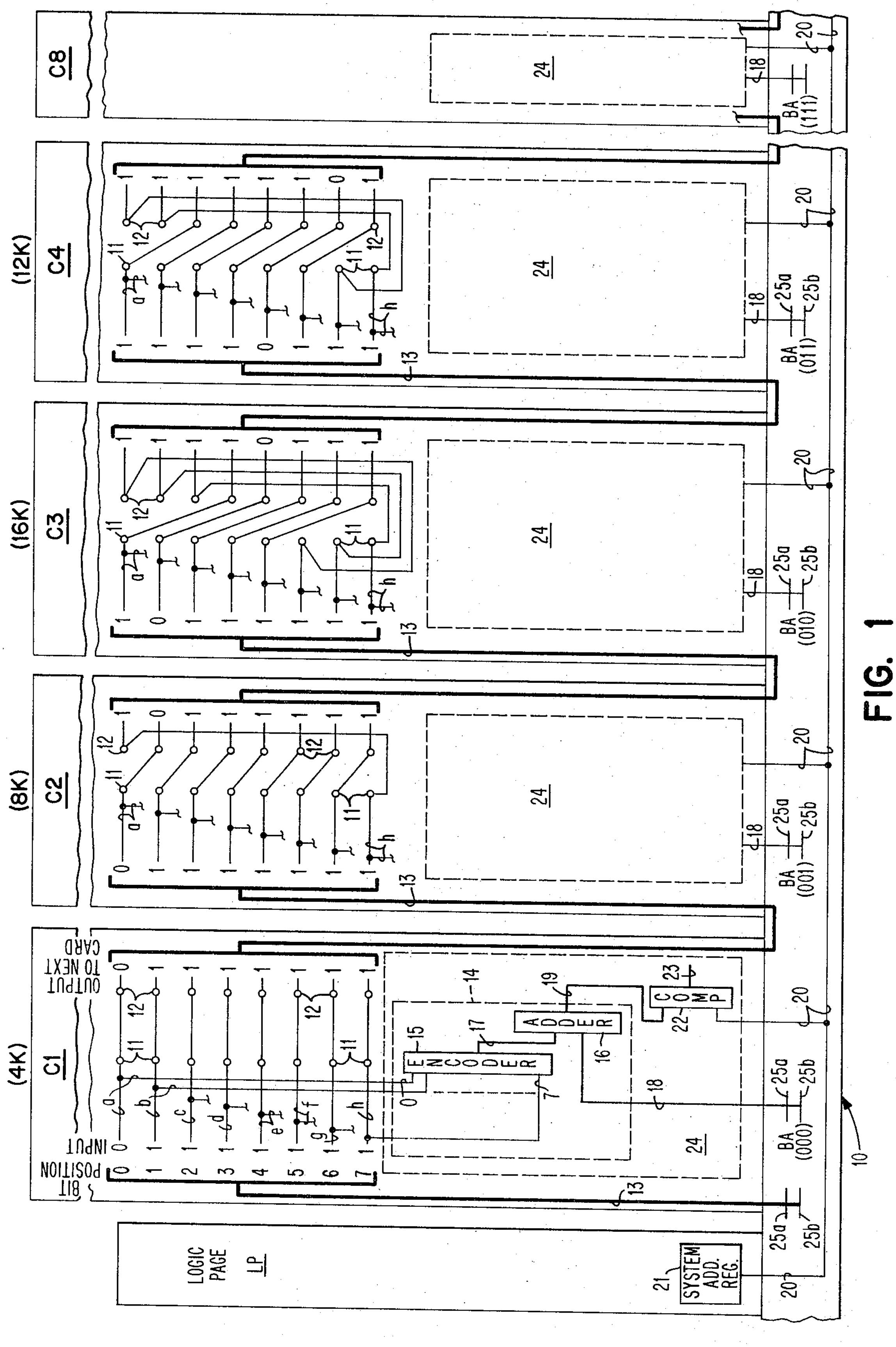
FIG. 1 is a schematic diagram illustrating a floating addressing system constructed according to one embodiment of the invention.

The floating addressing system illustrated in FIG. 1 comprises a plurality of pluggable memory cards C1–C8 and a Logic Page LP removably pluggable into a back panel 10, which is preferably a conventional multilayer interconnection printed circuit board. Each card C may comprise an array of modules each having a plurality of monolithic memory chips and appropriate circuits (none shown), all of which may be conventional in configuration and arranged in a manner familiar to those skilled in the art; e.g., as disclosed in U.S. Pat. No. 3,736,574.

According to the invention, all cards C have a number of addresses equal to an integral multiple of a basic number of addresses. As illustrated, this basic number is $4k$; and cards C1, C2, C3 and C4 have $4k$, $8k$, $16k$ and $12k$ addresses, respectively. Every card C of one particular standard size is absolutely identical with all others having the same address size. Hence, if card C5 had $8k$ addresses, it would be identical with card C2.

Irrespective of their address size, all cards C comprise an identical preselected number of input pins 11 and an equal number of output pins 12. Each set of pins 11, 12 is arranged in low to high order sequence to provide floating address inputs and outputs, respectively, with positions numbered 0–7. In each card C, the input pins 11 are connected by branches of lines 13*a–h* to an encoding means 14 that, as illustrated, comprises an encoder 15 and an adder 16. A fixed 8-bit d.c. signal is constantly applied to lines 13*a–h* in the manner hereinafter described and encoded by encoder 15 into a 3-bit output that is fed to adder 16 via lines 17. A base address unique to each card C1–C8 is constantly applied as a fixed d.c. signal to lines 18 in the manner hereinafter described. Adder 16 adds the binary encoded delta address (lines 17) to the unique base address (lines 18) to provide on lines 19 a distinctive assigned address for that particular card C1–C8. A system address is conveyed via lines 20 and back panel 10 from a system address register 21 on page LP in parallel to a comparator 22 on each card. Comparator 22 compares the card's distinctive assigned address (which is always present on lines 19) with the system address (applied periodically on lines 20) when one of the cards C is to be addressed. When the addresses match and thus indicate to one of these cards C1–C8 that it is the specific one selected, the comparator provides a signal in line 23 for initiating a desired control operation; e.g., entering into a control interface sequence with the address unit and responding to its request.

Thus, the cards C1–C8 per se are identical except for address size. Each comprises eight sets of input/output pins and control circuitry 24 which includes encoder means 14 and comparator 22. The novel manner in which the various cards are conditioned and interconnected will now be described.

A suitable d.c. source, preferably in the form of a ground plane 25*a* and voltage plane 25*b* in multilayer printed circuit back panel 10, provides either of two fixed d.c. signal levels (assumed as 0 or 1) in the lines 18 as necessary to provide the base address unique to each particular card C1–C8 in a hard wired manner to the connector into which the respective card C is plugged. This source 25*a,b* also provides, in a hard wired manner via back panel 10, a preselected coded fixed d.c. signal (herein illustratively assumed as 01111111) via the lines 13*a–h* to the input pins 11 at positions 0–7, respectively, of the first card only in the system; viz, card C1.

The output pin 12 of each card C is always connected straight across in an electrical sense with the input pin 11 of the succeeding card, as shown; but note that this connection is by way of the back panel and accomplished automatically upon plugging in of the card to eliminate any need for an additional special interconnection between cards.

In contradistinction, however, the input pin of each card is connected straight across to its associated output pin only if that particular card has the basic number of addresses (illustratively assumed as 4*k*). When a particular card has 2, 3 . . . *n* times the basic number of addresses, the input pins 11 of that card are connected with the associated output pins 12 thereon displaced 1, 2 . . . (*n*-1) places, respectively, toward the high order position, with end around carries being provided to generate the low order positions, as shown. Thus, pins 11 are connected straight across in the 4*k* card C1, but displaced one, three and two places, respectively, toward the high order in the 8*k*, 16*k* and 12*k* cards C2, C3, C4, respectively, as shown. As a result of these displacements, the fixed d.c. signal 01111111 to the input pins 11 of card C1 remains unmodified to C2, but then becomes 10111111 to C3, then 11110111 to C4, and 11111101 to C5. In this manner and by these displacements, each card in the sequence C1 to C8 sees the result of all previous shifts and thus determines its assigned address by a method herein referred to as "floating addressing."

It should be noted that once the system is configured, the floating address of each card C1–C8 does not change until the system is reconfigured. Moreover, the floating address is distributed by lines wired serially from the input pin on one card to the output pin on that card, thence straight across to the input pin on the succeeding card, through the system. The floating address is in the form of a d.c. signal that is always present and requires no time to propagate during system operation.

The number of delta address bit lines 13*a–h* required equals the number of additional basic 4*k* address increments that can precede the last card (C8, in the embodiment illustrated), plus one to provide a code representation of zero. It is thus apparent that since the input to card C5 is 11111101, only one of the cards C6, C7 can have 8*k* addresses and the other must have 4*k*, so that the input to C8 will be 11111101 or 11111110; if cards C6, C7 combined have more than 12*k* addresses, while the total addresses of cards C1–C5 remains at at least 40*k*, additional delta address lines will be needed so card C1 will not erroneously be selected when an address of 56–60*k* is desired. The number of base address bit lines 18 required is equal to the number of binary bits required to represent the maximum of number of card C to be accommodated in the system. Thus, the base address represents the address a given card C would have if all preceding cards had only the basic 4*k* addresses.

In operation, assume that some address between 28*k* and 40*k* is to be addressed. Since this address is in card C4, this card will be selected as follows.

The 8-bit delta address input 11110111 to pins 11 of card C4 will have been encoded by the associated encoder 15 to 100, denoting that four basic 4*k* address increments over and above the normal 4*k* addresses per card precede card C4. This encoded delta address is added by adder 16 to card C4's unique base address 011 to provide an assigned address of 0111 (100 plus 011) in lines 19 for card C4. Card C4 will now be conditioned to recognize addresses in the 28–40*k* range. As noted, this assigned address is always present because the d.c. signal is continuous. Hence, when system address register 21 calls for a particular system address, each card C compares its own computed assigned address with the address on system address lines 20; but only the comparator 22 of card C4 will give a compare signal on its lines 23 to establish communication with card C4 to perform the desired control operation.

Assume now that the 8*k* card C2 fails. It can be replaced by another 8*k* card C, or by a 4*k*, 12*k* or 16*k* card C as desired, without hardware change; i.e., merely by unplugging and replugging the respective cards, without rewiring or using parts with different numbers for the same address size. If the 8*k* card C2 is replaced by a 12*k* card (which will have its input pins 11 wired to its output pins in the same manner as shown for card C4), the delta floating address input to card C3 will be automatically modified from 10111111 to 11011111. Thereafter, card C2 will recognize addresses from 4–16$k$, card C3 from 16–32$k$, card C4 from 32–44$k$, etc.

Alternatively, upon failure of card C2, card C8 could be moved up and substituted to automatically eliminate any address gaps in the system.

In the modified embodiment illustrated in FIG. 2, the same reference numerals but primed will be used to denote components substantially similar to those described in connection with FIG. 1. This modified embodiment is preferred where the total number of addresses in the system is not excessive and/or the floating address can be handled completely by the number of input pins and output pins available. With this "total floating addressing" arrangement, there is no need for unique base address inputs and for the special adder (like 16) in the encoding means 14', since only one set of floating address lines is required and these are wired like the delta address lines of FIG. 1.

Figure 2:
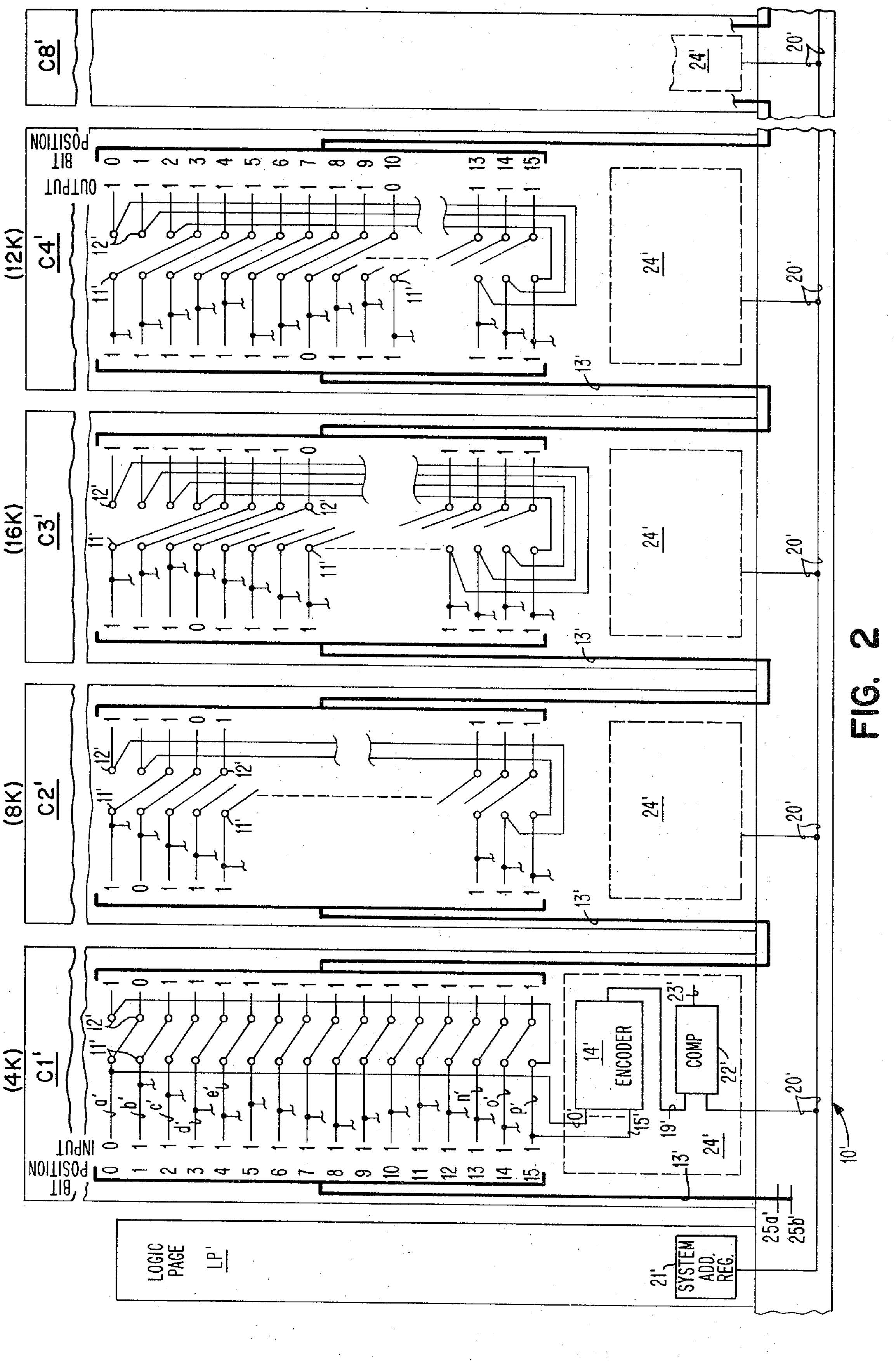
FIG. 2 is a schematic diagram illustrating a floating addressing system constructed according to a slightly modified embodiment of the invention.

Briefly, the modified embodiment differs from that of FIG. 2 in that branches of floating address lines 13$a'$–$p'$ provide a 16-bit input to encoding means 14' which provides a 4-bit output that is compared with a 4-bit system address in lines 20' to provide a compare signal in lines 23' when the computed assigned address (which is always present on lines 19') corresponds to the system address. In each card C' input pins 11' are connected to the associated output pins 12' shifted toward the high order position a number of bits exactly equal to the number of integrals of the number of basic addresses on that particular card; e.g., one place for each 4$k$ (instead of for each 4$k$ over the first 4$k$, as in FIG. 1). In all other respects, operation will be substantially the same as described in connection with FIG. 1, and hence need not be described in detail.

It will thus be seen that there has been provided a floating addressing system and method which enables respective standardized cards for each of a plurality of address sizes to be installed at random locations in the apparatus. Each such card will recognize automatically its proper address; and it will modify this address automatically if plugged in elsewhere in a reconfiguration of the system.

It will be understood that, if preferred, the back panel can be replaced with a plurality of cables which jumper between card-pluggable connectors at a plurality of respective locations. Such a cable interconnection would be especially suitable for interconnecting peripherals.

It should also be understood that terms such as "connecting each set of output pins of each unit with the same corresponding associated sets of input pins in the succeeding unit" are intended to cover not only the electrically straight across connection between pins of the same order position which is illustrated in both FIGS. 1 and 2 and preferred, but also connection with a constant position shift (e.g., always a one position shift toward the high order) from output pin of one unit to the input pin of the succeeding unit if, for some applications, this would be deemed desirable.

While the invention has been particularly shown and described with reference to preferred embodiments thereof, it will be understood by those skilled in the art that the foregoing and other changes in form and details may be made therein without departing from the spirit and scope of the invention. Accordingly, the floating addressing system and method are to be considered merely as illustrative, and the scope of the invention is to be limited only as specified in the claims.

What is claimed is:

1. Floating addressing system, comprising a plurality of addressable units having different numbers of addresses constituting integral multiples of a predetermined basic number, each of said units having a similar preselected number of pins representing floating address inputs and an identical number of pins representing floating address outputs, each set of input and output pins being arranged in low to high order sequence, means for applying a preselected coded signal to the input pins of a first one of said units, means connecting each input pin in each unit with that particular one of the output pins on the same unit that is indicative of the number of addresses such unit has, each of said particular output pins being displaced a similar predetermined number of places toward the high order position indicative of the number of said multiples of said basic number of addresses in said same unit to cause the coded input signal to be shifted toward the high order position said predetermined number of places and provide end around carries to generate any low order positions, means connecting the output pins of each unit always with the same corresponding associated input pins in the succeeding unit, encoding means for each unit for encoding the floating address input to that particular unit to provide for such unit an encoded output assigned address indicative of the number of multiples of said basic number of addresses that precedes that particular unit, comparator means associated with each unit for comparing the encoded assigned address with a selectable address corresponding to that of the unit to be selected to provide an output signal when the selectable address equals the encoded assigned address, and means for conveying the selectable address in parallel to each such comparator means.

2. The system according to claim 1, wherein said means for applying the preselected coded signal applies said signal as a continuous d.c. signal, thereby to cause said encoded output address to be continuously present as an input to the comparator means.

3. The system according to claim 1, wherein all of said units having the same numbers of addresses are of identical configuration irrespective of which unit they are sequentially in the system.

4. The system according to claim 1, including means providing to each of said units a base address distinctive to that particular unit, and wherein the first-mentioned means includes means providing a distinctive delta floating address input to the input pins of said first one of said units, and the encoding means for each unit includes an encoder for encoding the delta floating address input, and an adder for adding such encoded delta input to the base address to provide said encoded output assigned address for such unit.

5. The system according to claim 1, wherein the respective input pins on each unit are connected electrically straight across to the same order output pins on such unit when the latter has said basic number of addresses and are connected to the output pins with a shift toward the high order position a number of places equal to one less than the number of integral multiples of said basic number present in such unit.

6. The system according to claim 1, wherein the respective input pins on each unit are connected to the associated output pins with a shift toward the high order position that number of places equal to the number of integral multiples of said basic number of addresses in such unit.

7. In a floating addressing system, the combination of a plurality of addressable units having different numbers of addresses constituting integral multiples of a predetermined basic number, each of said units having a similar preselected number of pins representing floating address inputs and floating address outputs arranged in sets in low to high order sequence, means for applying a preselected coded signal to the input pins of a first one of said units, means connecting the set of input pins in each unit with that particular set of the output pins on the same unit that is indicative of the number of addresses such unit has, means connecting each set of output pins of each unit with the same corresponding associated set of input pins in the succeeding unit, and control circuit means for each unit providing for such unit an output assigned address indicative of the number of multiples of said basic number of addresses that precedes that particular unit, said control circuit means including means responsive to the floating address input to that particular unit.

8. In the system according to claim 7, wherein said means for applying the preselected coded signal applies said signal as a continuous d.c. signal, thereby to cause said output address to be continuously present.

9. In the system according to claim 7, said first-mentioned means comprising means providing a distinctive delta floating address input to the input pins of said first one of said units, and said control circuit means further including means providing to each of said units a base address distinctive to that particular unit, an encoder for encoding the delta floating address input, and an adder for adding such encoded delta input to the base address to provide said output assigned address for such unit.

10. In the system according to claim 9, comparator means associated with each unit for comparing the output assigned address with a selectable address corresponding to that of the unit to be selected to provide an output signal when the selectable address equals the assigned address, and means for conveying the selectable address in parallel to each such comparator means.

11. In the system according to claim 7, the respective input pins on each unit being connected electrically straight across to the same order output pins on such unit when the latter has said basic number of addresses and connected to the output pins with a shift toward the high order position a number of places equal to one less than the number of integral multiples of said basic number present in such unit when said unit has more than said basic number of addresses.

12. In the system according to claim 7, the respective input pins on each unit are connected to the associated output pins with a shift toward the high order position that number of places equal to the number of integral multiples of said basic number of addresses present in such unit.

13. In the system according to claim 7, the output pins of each unit being converted electrically straight across with the same order input pins of the succeeding unit.

* * * * *